United States Patent
Spillett et al.

(10) Patent No.: US 10,531,651 B1
(45) Date of Patent: Jan. 14, 2020

(54) ILLUMINATING STRIKING FISH ALERT DEVICE

(71) Applicants: Heather Spillett, Hot Springs, AR (US); Thomas D. Baker, Hot Springs, AR (US)

(72) Inventors: Heather Spillett, Hot Springs, AR (US); Thomas D. Baker, Hot Springs, AR (US)

( * ) Notice: Subject to any disclaimer, the term of this patent is extended or adjusted under 35 U.S.C. 154(b) by 169 days.

(21) Appl. No.: 15/496,811

(22) Filed: Apr. 25, 2017

Related U.S. Application Data

(60) Provisional application No. 62/327,114, filed on Apr. 25, 2016.

(51) Int. Cl.
*A01K 97/12* (2006.01)
*G08B 5/36* (2006.01)

(52) U.S. Cl.
CPC ............ *A01K 97/125* (2013.01); *A01K 97/12* (2013.01); *G08B 5/36* (2013.01)

(58) Field of Classification Search
CPC ....... A01K 97/12; A01K 97/01; A01K 97/125
USPC ........................................................ 43/4, 17
See application file for complete search history.

(56) References Cited

U.S. PATENT DOCUMENTS

| | | | | |
|---|---|---|---|---|
| 87,188 A * | 2/1869 | Monnier | ............... | A01K 97/125 242/305 |
| 1,177,885 A * | 4/1916 | Molnar | ................ | A01K 89/015 242/252 |
| 1,524,011 A * | 1/1925 | Ballew | ................... | A01K 91/10 43/15 |
| 2,032,537 A * | 3/1936 | Kozikowski | ......... | A01K 97/125 43/16 |
| 2,181,141 A | 11/1939 | Lovegran | | |
| 2,538,788 A * | 1/1951 | Massino | ............... | A01K 97/125 43/17 |
| 2,547,308 A * | 4/1951 | Dean | ...................... | A01K 93/00 43/17 |
| 2,567,777 A * | 9/1951 | Massino | ............... | A01K 97/125 43/17 |
| 2,575,156 A * | 11/1951 | Baugh | ..................... | A01K 97/01 242/381 |
| 2,577,552 A * | 12/1951 | White, Jr. | ............... | A01K 91/10 242/375.1 |
| 2,732,543 A * | 1/1956 | Mogren | ................. | A01K 97/01 43/17 |

(Continued)

FOREIGN PATENT DOCUMENTS

| CH | 248397 A | * | 5/1947 | ............ A01K 97/12 |
|---|---|---|---|---|
| CN | 2430851 Y | * | 5/2001 | |

(Continued)

OTHER PUBLICATIONS

English translation of CN 2430851 from Google Patents (Year: 2001).*

*Primary Examiner* — Darren W Ark

(57) ABSTRACT

An illuminated striking fish alert device includes a fishing reel affixed to a plate, a power source secured to the plate, and illumination source secured to the power source. Fishing line from the reel is in mechanical communication with motion capturing rods which in turn are in electrical communication with the illumination source and power source. The intensity and rate of illumination of the illumination source is configured to correlate directly with the speed and motion of the fishing line.

20 Claims, 2 Drawing Sheets

(56) References Cited

U.S. PATENT DOCUMENTS

| | | | | |
|---|---|---|---|---|
| 2,791,857 A * | 5/1957 | Schrader | ............ | A01K 97/01 43/16 |
| 3,023,532 A * | 3/1962 | Gorenty | ............ | A01K 97/12 43/17 |
| 3,207,451 A * | 9/1965 | Kane | ............ | A01K 89/017 242/390.9 |
| 3,352,048 A * | 11/1967 | Fleming | ............ | A01K 97/01 43/17 |
| 3,359,673 A * | 12/1967 | Roemer | ............ | A01K 97/01 43/17 |
| 3,394,484 A * | 7/1968 | Sonoski | ............ | A01K 97/01 43/16 |
| 3,440,753 A * | 4/1969 | Kelley | ............ | A01K 97/125 43/17 |
| 3,474,561 A * | 10/1969 | McConkey | ............ | A01K 97/01 43/16 |
| 3,879,880 A * | 4/1975 | Bailey | ............ | A01K 97/125 43/17 |
| 4,246,716 A * | 1/1981 | Elmer | ............ | A01K 97/01 43/17 |
| 4,471,554 A * | 9/1984 | Heiskell | ............ | A01K 97/125 43/17 |
| 4,616,437 A * | 10/1986 | Harvey | ............ | A01K 97/125 43/17 |
| 4,621,446 A * | 11/1986 | Anderson | ............ | A01K 97/01 43/17 |
| 4,633,608 A * | 1/1987 | Savarino | ............ | A01K 97/125 43/17 |
| 4,651,459 A * | 3/1987 | Wurtz | ............ | A01K 97/12 43/15 |
| 4,934,090 A * | 6/1990 | Storey | ............ | A01K 97/01 43/16 |
| 4,980,986 A * | 1/1991 | Harper | ............ | A01K 97/01 43/17 |
| 5,010,678 A * | 4/1991 | Peck | ............ | A01K 97/125 43/17 |
| 5,074,072 A * | 12/1991 | Serocki | ............ | A01K 97/01 43/16 |
| 5,119,577 A * | 6/1992 | Lilly | ............ | A01K 97/01 43/17 |
| 5,124,011 A | 6/1992 | Rogers et al. | | |
| 5,168,651 A * | 12/1992 | Wilson | ............ | A01K 91/06 43/15 |
| 5,321,391 A * | 6/1994 | Fox | ............ | A01K 97/125 340/573.2 |
| 5,937,566 A * | 8/1999 | Buczkowski | ............ | A01K 93/02 43/17 |
| 6,393,753 B1 * | 5/2002 | Walker | ............ | A01K 97/125 43/17 |
| 6,446,380 B1 * | 9/2002 | Radosavljevic | ............ | A01K 87/007 43/16 |
| 7,131,231 B1 * | 11/2006 | Lee | ............ | A01K 93/02 43/17 |
| 7,395,628 B2 * | 7/2008 | Rayfield | ............ | A01K 97/125 43/17 |
| 7,797,876 B2 * | 9/2010 | McKelvey | ............ | A01K 89/08 43/15 |
| 7,921,592 B2 * | 4/2011 | Carelock | ............ | A01K 91/10 43/16 |
| 8,316,577 B2 * | 11/2012 | Hale | ............ | A01K 89/08 43/43.11 |
| 9,398,764 B2 * | 7/2016 | Trout | ............ | A01K 97/125 |
| 9,420,775 B1 * | 8/2016 | Ridler | ............ | A01K 97/125 |
| 10,206,385 B2 * | 2/2019 | Preller, Jr. | ............ | A01K 97/12 |
| 2008/0066366 A1 * | 3/2008 | Todd | ............ | A01K 97/125 43/17 |
| 2009/0158635 A1 * | 6/2009 | Hope | ............ | A01K 97/125 43/4.5 |
| 2010/0005699 A1 * | 1/2010 | Carelock | ............ | A01K 91/10 43/16 |
| 2014/0215894 A1 | 8/2014 | Mika | | |
| 2016/0100564 A1 * | 4/2016 | Perez | ............ | A01K 97/125 43/4.5 |

FOREIGN PATENT DOCUMENTS

| | | | | |
|---|---|---|---|---|
| DE | 3534710 A1 * | 4/1986 | ............ | A01K 89/00 |
| DE | 3622739 A1 * | 1/1988 | ............ | A01K 91/10 |
| EP | 2060176 A1 * | 5/2009 | ............ | A01K 97/125 |
| GB | 2216372 A * | 10/1989 | ............ | A01K 97/125 |
| JP | 08332011 A * | 12/1996 | | |

* cited by examiner

ILLUMINATING STRIKING FISH ALERT DEVICE

RELATED APPLICATIONS

The present invention was first described in and claims the benefit of U.S. Provisional Application No. 62/327,114, filed Apr. 25, 2016, the entire disclosures of which are incorporated herein by reference.

FIELD OF THE INVENTION

The present invention relates generally to the field of fishing accessories and more specifically relates to an illuminated striking fish alert.

BACKGROUND OF THE INVENTION

Fishing is the activity of trying to catch fish. Fishing sometimes takes place in the wild. Techniques for catching fish include hand gathering, spearing, netting, angling and trapping. Recreational and sport fishing are fishing primarily for pleasure or competition. Recreational fishing has conventions, rules, licensing restrictions and laws that limit the way in which fish may be caught; typically, these prohibit the use of nets and the catching of fish with hooks not in the mouth. The most common form of recreational fishing is done with a rod, reel, line, hooks and any one (1) of a wide range of baits or lures such as artificial flies. The practice of catching or attempting to catch fish with a hook is generally known as angling. In angling, it is sometimes expected or required that fish be returned to the water (catch and release). Recreational or sport fishermen may log their catches or participate in fishing competitions.

Daytime fishing during hot weather can be uncomfortable and unproductive. Some fish swim deep during the day and when the weather cools down the fish move up shallower, where they can feed on nocturnal forage such as crawfish. Therefore, many people go night fishing. However, fishing in the dark may be dangerous and require additional safety precautions. A suitable solution is desired.

Various attempts have been made to solve problems found in fishing accessory art. Among these are found in: U.S. and Foreign Pat. Nos. CN 2430851; 4,471,554; 6,446,380; 3,023,532; and 2,547,308. These prior art references are representative of fishing accessories.

None of the above inventions and patents, taken either singly or in combination, is seen to describe the invention as claimed. Thus, a need exists for a reliable illuminated striking fish alert, and to avoid the above-mentioned problems.

SUMMARY OF THE INVENTION

The inventor has recognized the aforementioned issues and inherent problems and observed that there is a lack in the prior art for an illuminated striking fish alert.

It is therefore an object of the invention to provide an a fish strike indicator having a housing comprising a housing first face, second face, top side, bottom side, first side, second side, an interior, a power source which is secured within the interior, a generator in electrical communication with the power source, a power switch disposed upon the housing first face and in electrical communication with the power source and the generator and a microprocessor in electrical communication with the power source, the generator and the power switch.

The indicator also comprises a wand having a top side and a bottom side which is secured to and perpendicularly extends from the housing top side, an illumination means which is disposed within the wand bottom side and in electrical communication with the microprocessor and a junction box. The junction box comprises a first face secured to the housing second face, second face, first corner, second corner, third corner and a fourth corner and a carrier bolt having a first end and a second end which is disposed through the junction box adjacent the junction box third corner and through the housing adjacent the housing bottom side. The carrier bolt is in mechanical communication with the generator.

The indicator also comprises a spool having a first disk with a first disk first side and a first disk second side, a second disk having a second disk first side and a second disk second side and a bearing sleeve centrally secured between the first disk second side and the second disk first side. The spool is rotatably secured to the carrier bolt first end through the bearing sleeve while being capable of retaining a length of line.

The indicator also comprises a radial bearing which is disposed about the carrier bolt between the spool second disk second side and the junction box second face, a first tension bar which is disposed upon the junction box second face above the spool and between the junction box first corner and the junction box fourth corner, a motion adjustment bar which is disposed upon the junction box second face above the spool and subjacent the junction box first corner, a second tension bar which is disposed upon the junction box above the spool and adjacent the junction box second corner, a spool catch which is disposed upon the junction box above the spool and subjacent the motion adjustment bar and the second tension bar, a mounting aperture which is disposed upon the junction box second face above the spool and adjacent the junction box first corner, an eyelet disposed upon the junction box second face above the spool and adjacent the junction box second corner and a plurality of catch notches which are disposed adjacent an edge of the first disk first side. A mounting aperture may also be provided in a separate embodiment which is disposed upon the junction box second face above the spool and adjacent the junction box first corner.

The line is routed around the spool, the first tension bar, the motion adjustment bar, and the second tension bar and through the eyelet. When the line is pulled causing a rotation of the spool, the rotation causes a rotation of the carrier bolt which activates the generator and generates an electrical signal. The electrical signal is transmitted to the microprocessor, thereby activating the illuminating means.

The electrical signal may be proportionally related to an amount of movement generated by the rotation of the spool. The proportional electrical signal is communicated to the microprocessor, thereby generating a proportional response which controls the illumination means effecting an intensity and a frequency those means. The wand may be made of either a transparent or translucent material thereby permitting illumination generated by the illuminating means to pass through the wand. The illumination means may comprise a light-emitting diode (LED). The power supply may take the form of a battery. The housing of the device may be made of either metal or plastic.

BRIEF DESCRIPTION OF THE DRAWINGS

The advantages and features of the present invention will become better understood with reference to the following

Figure 3:
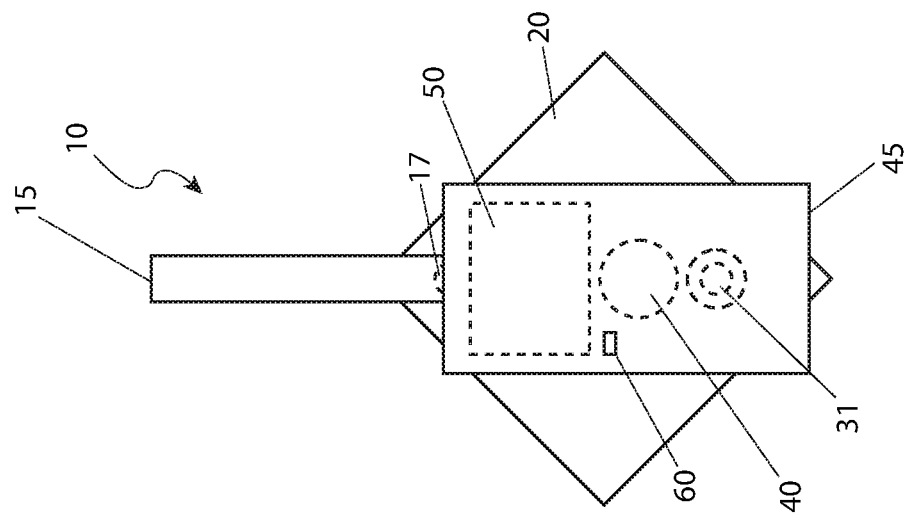
FIG. 3 is a rear view of an illuminated striking fish alert 10, according to an embodiment of the present invention; and, FIG. 4 is an electrical schematic diagram depicting major electrical components of the illuminated striking fish alert 10, according to an embodiment of the present invention.

DESCRIPTIVE KEY 10 illuminated striking fish alert
15 wand
17 illuminating lamp
19 mounting aperture
20 junction box
21 first tension bar
22 motion adjustment bar
23 second tension bar
25 spool catch
27 eyelet
30 spool
31 carrier bolt
32 radial bearing
33 bearing sleeve
35 drive belt
37 catch notch
38 line
40 generator
45 housing
50 microprocessor
55 battery
60 power switch

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiments, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only these particular configurations shall be shown and described for purposes of clarity and disclosure and not by way of limitation of scope.

The terms "a" and "an" herein do not denote a limitation of quantity, but rather denote the presence of at least one (1) of the referenced items.

The present invention is directed to an illuminated striking fish alert (herein described as the "device") 10. In one (1) embodiment of the present invention, the device 10 may comprise an illuminating lamp 17 such as an LED light that alerts fisherman when a fish strikes the device 10.

Referring now to the drawings, there is shown in FIG. 1 through FIG. 4 a device 10 during an "in-use" condition. When the device 10 is pulled upon by a fish during the act of fishing, an illuminating lamp 17 is activated that alerts fisherman and allows them to see if they have a fish on the line. The device 10 is designed to catch fish while night fishing and to watch the wand 15 illuminate when a fish is caught. The device 10 is also designed to catch fish from along the bank of a river, stream, or pond or from a boat. The device 10 would utilize standard fishing line 38 of a weight (strength) suitable for the size of fish intending to be caught. Additionally, the line 38 would be equipped with a hook (not shown) and enough split shot (not shown) to hold the line 38 vertical in the water.

Also, the hook would be supplied with bait (not shown) and adequate slack in the line 38 as supplied from a spool 30 so the bait will fall at least two feet (2 ft.) into the water. Finally, the user would set the device 10 in a desired position and leave for an extended time.

The junction box 20 has a mounting aperture 19 located adjacent the upper end thereof, ostensibly for attaching a hanger which is capable of supporting the entire device 10 for a support structure, such as the branch of an overhanging tree. Also attached to the junction box 20 is a first tension bar 21, a motion adjustment bar 22, and a second tension bar 23. The line 38 pays out from the spool 30 and is routed around the first tension bar 21, the motion adjustment bar 22, and the second tension bar 23, and routs through an eyelet 27 mounted to the junction box 20, prior to being used for fishing. It is appreciated that any hooks, floats, bobbers, sinkers and/or bait be attached to the line 38 after the line 38 passes through the eyelet 27. A plurality of catch notches 37 are equidistantly spaced radially about one (1) of the faces of the spool 30. A spool catch 25 is affixed to the junction box 20, adjacent to the spool 30, and is capable of temporarily arresting movement of the spool 30.

A housing 45 for the electrical components is mounted to a rear of a junction box 20. A spool 30 is mounted to both the junction box 20 and the housing 45 via a carrier bolt 31 with a bearing sleeve 33. The carrier bolt 31, mounted to the housing 45 via a radial bearing 32, drives a drive belt 35 which is in operable communication with a generator 40 housed within the housing 45. The generator 40, creates a signal that is sent to the microprocessor 50 which then activates the illumination lamp 17 via power from a battery 55. The wand 15 is preferably a hollow, transparent or translucent device, such as a glow stick tubular element, enabling light to pass through and fully illuminate via the illuminating lamp 17. Both the wand 15 and the illumination lamp 17 are mounted to the top of the housing 45, with the illumination lamp 17 immediately subjacent from the wand 15.

The illuminating lamp 17 flashes as the fishing line 38 is pulled and stays illuminated when the fish is caught. When the line 38 is pulled faster or with more force, the illuminating lamp 17 may flash or blink faster. When the line 38 is pulled slower or with less force, the illuminating lamp 17 may flash or blink more slowly. Alternatively, the intensity of the illuminating lamp 17 component may increase or decrease as the line 38 is pulled with more force or less force respectively. Once a fish is caught, the illuminating lamp 17 remains on, as determined by constant pressure over.

The microprocessor 50 of the device 10 is preferably powered using AAA batteries 55. In a preferred embodiment, the device will be manufactured using metal, plastics, and or waterproof materials. The exact specifications, materials used, and method of use of the device 10 may vary upon manufacturing.

Figure 2:
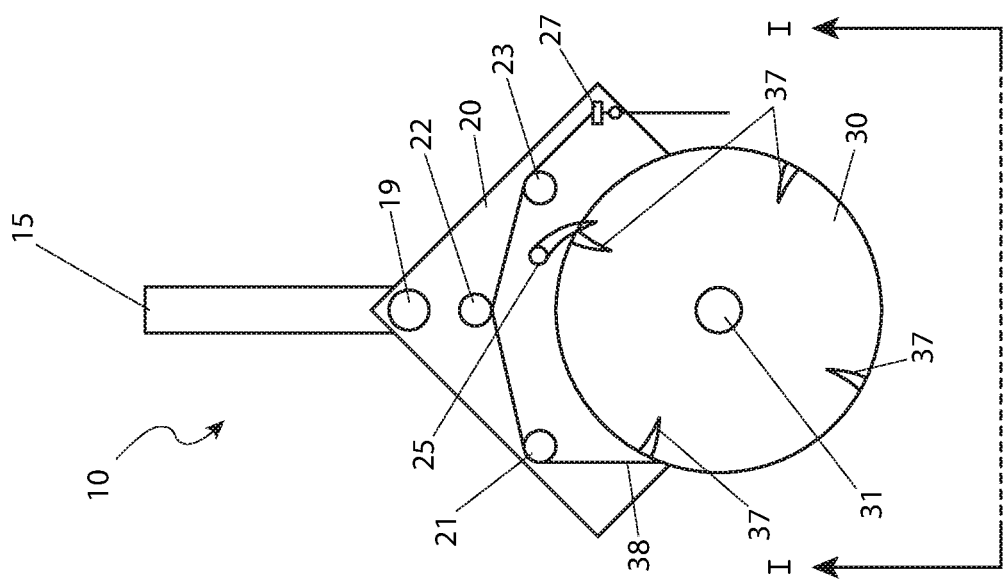
FIG. 2 is a sectional view as seen along a line I-I, as shown in FIG. 1, of an illuminated striking fish alert 10, according to an embodiment of the present invention.
Figure 1:
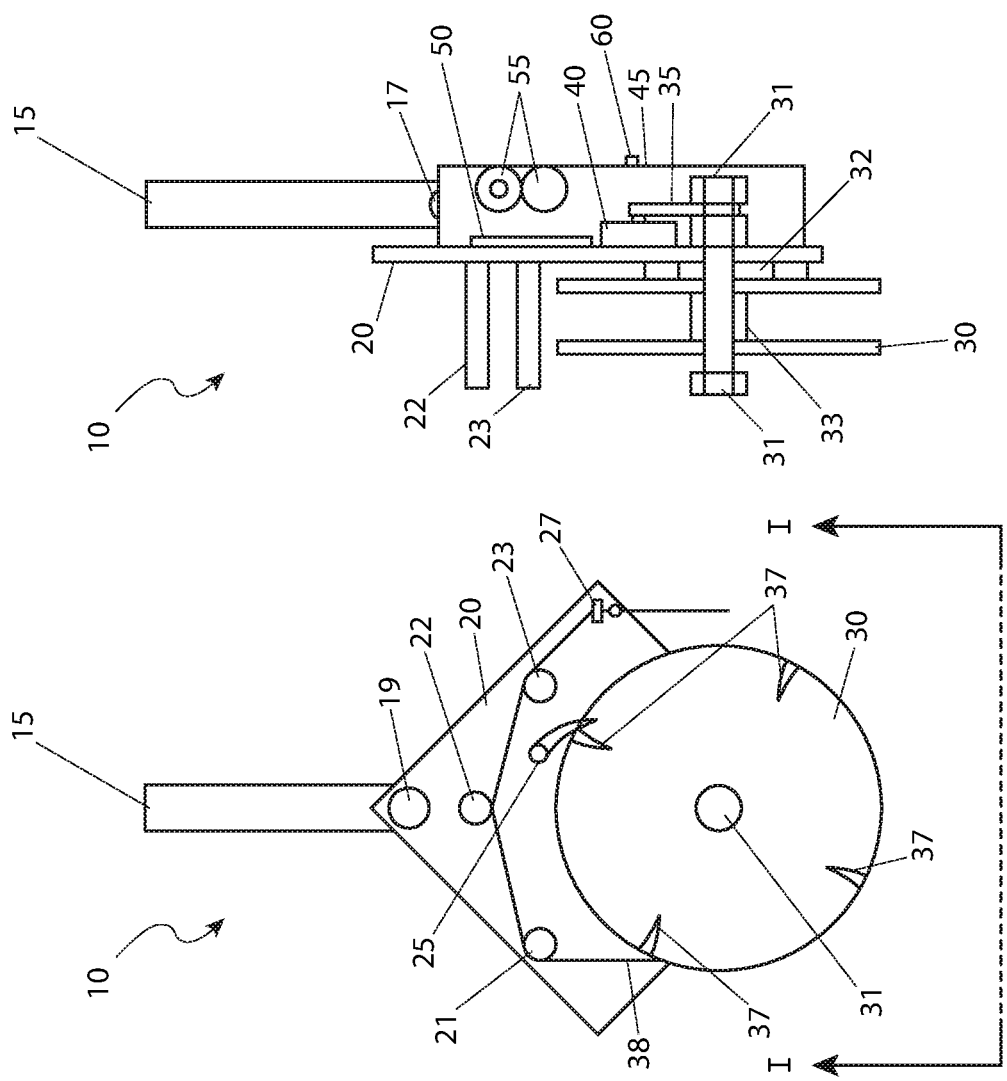
FIG. 1 is a front view of illuminated striking fish alert 10, according to an embodiment of the present invention.
Figure 4:
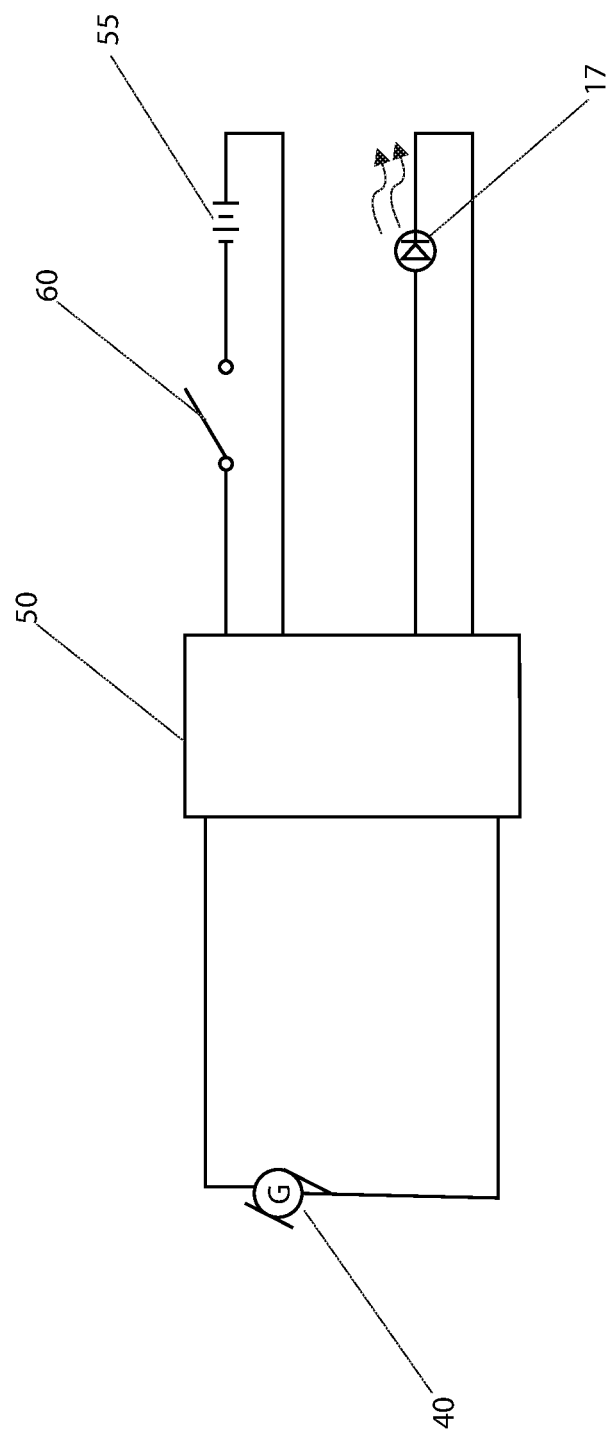

Referring finally to FIG. 4, an electrical schematic diagram depicting major electrical components of the illuminated striking fish alert 10, according to an embodiment of the present invention is disclosed. The generator 40 generates a proportional electrical signal related to the amount of movement and force generated by the spool 30 (as shown in FIG. 2). The signal is then fed into an analog input on the microprocessor 50. An internal program then generates a proportional signal to operate the illumination lamp 17 in a likewise proportional manner such as light intensity, light flash rate and the like. When a constant force upon the spool 30 (as shown in FIG. 2) is generated, as would be typical of a fish that has been caught, the illumination lamp 17 remains in a constantly illuminated state. User replaceable batteries 55 provide input power for the device as controlled through a power switch 60.

The exact specifications, materials used, and method of use of the device 10 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A fish strike indicator, comprising:
 a housing, comprising:
  a housing first face;
  a housing second face;
  a housing top side;
  a housing bottom side;
  a housing first side;
  a housing second side;
  a housing interior;
  a power source secured within said housing interior;
 a generator generating an electrical signal
 a power switch disposed upon said housing first face in electrical communication with said power source and said generator;
 a microprocessor in electrical communication with said power source, said generator and said power switch;
 a wand having a wand top side and a wand bottom side secured to and perpendicularly extending from said housing top side;
 an illuminating means disposed within said wand bottom side and in electrical communication with said microprocessor;
 a junction box, comprising:
  a junction box first face, secured to said housing second face;
  a junction box second face;
  a junction box first corner;
  a junction box second corner;
  a junction box third corner; and,
  a junction box fourth corner;
 a carrier bolt having a carrier bolt first end and a carrier bolt second end disposed through said junction box adjacent said junction box third corner and through said housing adjacent said housing bottom side and in mechanical communication with said generator;
 a spool, comprising:
  a first disk having a first disk first side and a first disk second side;
  a second disk having a second disk first side and a second disk second side;
  a bearing sleeve centrally secured between said first disk second side and said second disk first side;
  wherein said spool is rotatably secured to said carrier bolt first end through said bearing sleeve; and,
  wherein said spool retains a length of a line;
 a radial bearing disposed about said carrier bolt between said spool second disk second side and said junction box second face;
 a first tension bar disposed upon said junction box second face above said spool and between said junction box first corner and said junction box fourth corner;
 a motion adjustment bar disposed upon said junction box second face above said spool and subjacent said junction box first corner;
 a second tension bar disposed upon said junction box above said spool and adjacent said junction box second corner;
 a spool catch disposed upon said junction box above said spool and subjacent said motion adjustment bar and said second tension bar;
 an eyelet disposed upon said junction box second face above said spool and adjacent said junction box second corner; and,
 a plurality of catch notches disposed adjacent an edge of said first disk first side;
 wherein said line is routed around said spool, said first tension bar, said motion adjustment bar, and said second tension bar and through said eyelet;
 wherein when said line is pulled causing a rotation of said spool, said rotation causes a rotation of said carrier bolt which activates said generator and generates said electrical signal; and,
 wherein said electrical signal is transmitted to said microprocessor, thereby activating said illuminating means.

2. The indictor of claim 1, wherein said electrical signal is proportionally related to an amount of movement generated by said rotation of said spool.

3. The indicator of claim 2, wherein said electrical signal is communicated to said microprocessor, thereby generating a proportional response controlling said illuminating means thereby effecting an intensity and a frequency of illumination thereof.

4. The indicator of claim 1, wherein said wand comprises a transparent material thereby permitting illumination generated by said illuminating means to pass therethrough.

5. The indicator of claim 4, wherein said illuminating means comprises an LED.

6. The indicator of claim 1, wherein said wand comprises a translucent material thereby permitting illumination generated by said illuminating means to pass therethrough.

7. The indicator of claim 6, wherein said illuminating means comprises an LED.

8. The indicator of claim 1, further comprising a mounting aperture disposed through said junction box first and second faces and above said spool and adjacent said junction box first corner.

9. The indicator of claim 1, wherein said housing comprises metal.

10. The indicator of claim 1, wherein said housing comprises plastic.

11. A fish strike indicator, comprising:
 a housing, comprising:
  a housing first face;
  a housing second face;
  a housing top side;

a housing bottom side;
a housing first side;
a housing second side;
a housing interior;
a power source secured within said housing interior;
a generator generating an electrical signal;
a power switch disposed upon said housing first face in electrical communication with said power source and said generator;
a microprocessor in electrical communication with said power source, said generator and said power switch;
a wand having a wand top side and a wand bottom side secured to and perpendicularly extending from said housing top side;
an illuminating means disposed within said wand bottom side and in electrical communication with said microprocessor;
wherein said electrical signal generated by said generator is sent to said microprocessor which then activates said illuminating means via power from said power source;
a junction box, comprising:
    a junction box first face, secured to said housing second face;
    a junction box second face;
    a junction box first corner;
    a junction box second corner;
    a junction box third corner; and,
    a junction box fourth corner;
a carrier bolt having a carrier bolt first end and a carrier bolt second end disposed through said junction box adjacent said junction box third corner and through said housing adjacent said housing bottom side and in mechanical communication with said generator;
a spool, comprising:
    a first disk having a first disk first side and a first disk second side;
    a second disk having a second disk first side and a second disk second side;
    a bearing sleeve centrally secured between said first disk second side and said second disk first side;
wherein said spool is rotatably secured to said carrier bolt first end through said bearing sleeve; and,
wherein said spool retains a length of a line;
a radial bearing disposed about said carrier bolt between said spool second disk second side and said junction box second face;
a first tension bar disposed upon said junction box second face above said spool and between said junction box first corner and said junction box fourth corner;
a motion adjustment bar disposed upon said junction box second face above said spool and subjacent said junction box first corner;
a second tension bar disposed upon said junction box above said spool and adjacent said junction box second corner;
a spool catch disposed upon said junction box above said spool and subjacent said motion adjustment bar and said second tension bar;
a mounting aperture disposed through said junction box first and second faces and above said spool and adjacent said junction box first corner;
an eyelet disposed upon said junction box second face above said spool and adjacent said junction box second corner; and,
a plurality of catch notches disposed adjacent an edge of said first disk first side;
wherein said line is routed around said spool, said first tension bar, said motion adjustment bar, and said second tension bar and through said eyelet;
wherein when said line is pulled causing a rotation of said spool, said rotation causes a rotation of said carrier bolt which activates said generator and generates said electrical signal; and,
wherein said electrical signal is transmitted to said microprocessor, thereby activating said illuminating means.

12. The indictor of claim 11, wherein said electrical signal is proportionally related to an amount of movement generated by said rotation of said spool.

13. The indicator of claim 12, wherein said electrical signal is communicated to said microprocessor, thereby generating a proportional response controlling said illuminating means thereby effecting an intensity and a frequency of illumination thereof.

14. The indicator of claim 11, wherein said wand comprises a transparent material thereby permitting illumination generated by said illuminating means to pass therethrough.

15. The indicator of claim 14, wherein said illuminating means comprises an LED.

16. The indicator of claim 11, wherein said wand comprises a translucent material thereby permitting illumination generated by said illuminating means to pass therethrough.

17. The indicator of claim 16, wherein said illuminating means comprises an LED.

18. The indicator of claim 11, wherein said power supply comprises a replaceable battery.

19. The indicator of claim 11, wherein said housing comprises metal.

20. The indicator of claim 11, wherein said housing comprises plastic.

* * * * *